United States Patent
Hakansson et al.

(10) Patent No.: US 8,971,816 B2
(45) Date of Patent: Mar. 3, 2015

(54) METHOD AND ARRANGEMENT FOR ASSISTING IN DIRECTION ADJUSTMENT OF A DIRECTIONAL ANTENNA

(75) Inventors: Peter Hakansson, Lidingo (SE); Benny Lennartson, Hagersten (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1049 days.

(21) Appl. No.: 12/864,771

(22) PCT Filed: Jan. 31, 2008

(86) PCT No.: PCT/SE2008/050123
§ 371 (c)(1),
(2), (4) Date: Jul. 27, 2010

(87) PCT Pub. No.: WO2009/096834
PCT Pub. Date: Aug. 6, 2009

(65) Prior Publication Data
US 2010/0317298 A1    Dec. 16, 2010

(51) Int. Cl.
*H01Q 3/00* (2006.01)
*H01Q 3/26* (2006.01)
*H01Q 1/12* (2006.01)

(52) U.S. Cl.
CPC ............... *H01Q 3/26* (2013.01); *H01Q 1/1257* (2013.01); *H01Q 3/005* (2013.01)
USPC .......................... 455/63.4; 455/575.7; 455/97

(58) Field of Classification Search
CPC ...................................................... H04B 7/028
USPC ........................................ 455/63.4, 575.7, 97
See application file for complete search history.

(56) References Cited

U.S. PATENT DOCUMENTS

| | | | |
|---|---|---|---|
| 6,370,377 B1 | 4/2002 | Take et al. | |
| 6,671,495 B1 * | 12/2003 | Lappetelainen et al. | ... 455/67.11 |
| 7,725,080 B2 * | 5/2010 | Tegreene | ..................... 455/63.4 |
| 7,996,034 B1 * | 8/2011 | Yegnashankaran et al. | ........................... 455/550.1 |
| 2002/0137538 A1 | 9/2002 | Chen et al. | |
| 2004/0053634 A1 * | 3/2004 | Gainey et al. | ................. 455/522 |
| 2006/0073850 A1 * | 4/2006 | Cha et al. | .................... 455/562.1 |
| 2006/0079220 A1 * | 4/2006 | Cha et al. | ...................... 455/423 |
| 2006/0264184 A1 * | 11/2006 | Li et al. | ......................... 455/101 |
| 2006/0292991 A1 * | 12/2006 | Abramov et al. | ............ 455/63.4 |
| 2007/0218950 A1 * | 9/2007 | Codreanu et al. | .......... 455/562.1 |
| 2007/0270155 A1 * | 11/2007 | Nelson et al. | .............. 455/452.2 |
| 2008/0036670 A1 * | 2/2008 | Arvidsson et al. | ............ 343/758 |

* cited by examiner

*Primary Examiner* — Wen Huang
(74) *Attorney, Agent, or Firm* — Rothwell, Figg, Ernst & Manbeck, P.C.

(57) ABSTRACT

An object of the present invention is to provide an improved and simplified mechanism for assisting in antenna direction adjustment. The object is achieved by a method in a wireless communication device 120 for assisting in direction adjustment of a directional antenna 125. The wireless communication device 120 is adapted to be connected to a wireless communication system 100 via a directional antenna 125. The wireless communication system 100 comprises a service node 150.

The method comprises the first step of establishing 510 a radio connection to the wireless communication system 100 via the directional antenna 125 and the second step of sending 520 a request for antenna direction information to the service node 150 and the third step of receiving 530 the requested antenna direction information from the service node 150 and the fourth step of obtaining 540 performance measurement and the fifth step of sending 550 the obtained performance measurement to the service node 150 and the sixth step of receiving 560 an indication of an antenna direction to be used from the service node 150.

24 Claims, 4 Drawing Sheets

METHOD AND ARRANGEMENT FOR ASSISTING IN DIRECTION ADJUSTMENT OF A DIRECTIONAL ANTENNA

CROSS-REFERENCE TO RELATED APPLICATION

This application is a 35 U.S.C. §371 National Phase Application from PCT/SE2008/050123, filed Jan. 31, 2008, and designating the United States.

TECHNICAL FIELD

The present invention relates to the field of directional antennas. More specifically it relates to a method and an arrangement in a wireless communication device, a method and an arrangement in a node for assisting in direction adjustment of a directional antenna.

BACKGROUND

Wireless communications networks are wide area cellular telephone networks providing information services to end users via end wireless communication devices, such as e.g. a hand-held telephone, a card in a laptop computer, a personal digital assistant (PDA). The wireless communication device is varyingly known as a User Equipment (UE), a terminal equipment, a mobile station (MS), etc., depending on the standard. The wireless communications networks offer a wide range of information services to the end users. The information services may be e.g. text messaging, high-speed internet access, video telephony and telephony. The different services contain varying amounts of information, that is to say they require different amounts of bandwidth when being transmitted. Text messaging, such as Short Message Service (SMS) require only a small amount of bandwidth when transmitted whereas video telephony on the other hand require a considerable larger amount of bandwidth, to handle and synchronize both sound and vision.

The wireless communications network comprises a plural of Radio Access Networks (RAN). RAN implements radio access technology allowing connectivity between the wireless communication devices and the Core Network (CN) via a radio antenna such as e.g. a Radio Base Station (RBS), a Node-B, Base Station (BS). The connection, i.e. the transmission path, between the wireless communication device and base station is called an up-link whereas the transmission path between the base station and the wireless communication device is called a down-link. The up-link and the down-link constitute the radio link. Typically, the radio link is the weak point of the transmission, providing the smallest amount of bandwidth. RAN may further comprise radio interface controllers, such as e.g. a Base Station Controller (BSC), a Radio Network Controller (RNC), providing control functionalities for one or more base stations. The wireless communications network is connectable to an infrastructure network such as a CN. The main functions of the CN is to provide switching, routing and transmission of user traffic. CN further enables charging and network management functions. Examples of such network management functions are measurement of radio link transmission performance and subsequent adjustments of transmission settings to enhance/optimize the transmission performance. These functions are in most cases performed by Operation & Maintenance (O&M) nodes such as e.g. an Operations Support System (OSS).

A challenge for operators of wireless networks today is to provide sufficient network coverage everywhere in all cells, thus enabling communication at highest possible data rates for all wireless end users. This may be the case for power regulated wireless networks such as e.g. the Third Generation (3G) wireless communication systems including the Time Division-Synchronous Code Division Multiple Access (TD-SCDMA). In these power regulated wireless networks; the communication is limited to lower data rates to compensate for the increased power used when the network coverage is insufficient. This may be the case in rural areas with insufficient network coverage. Thus the user of the wireless communication device experiences less quality communication or even no communication at all. This limits the end users' communication. One way of enabling sufficient network coverage in rural areas may be to install more radio base stations. However, this is rarely economically advantageous since the number of end users is small.

The challenge of providing sufficient network coverage may also be valid in the case of highly populated areas with high traffic load, i.e. wherein there are too many simultaneous end users in the same cell competing for the bandwidth. When more wireless communication devices are become active in a cell and in adjacent cells, frequency interference becomes greater and thus error rates increase. As error rates increase, to maintain signal strength, the operator of the wireless communication system may decrease the maximum data rates allowable. Thus, one method of by which data rates can be increased in a cell is to decrease the number of active wireless communication devices thus clearing the airwaves of potential interference. However this is rarely an effective mechanism to increase data rates due to the loss of paying customers.

Yet another way of enhancing the network coverage to increase the data rates is to install an external antenna, such as e.g. a fixed external antenna, to the wireless communication device. Equipments using such fixed external antennas are e.g. portable or stationary equipment such as laptops with PC data cards, fixed wireless terminals (FWT) or mobile phones used instead of fixed lines in remote areas where there are no fixed telephone network.

The most common type of antenna for transmitting and receiving signals at the wireless communication device is an omnidirectional antenna. The signal transmitted from an omnidirectional antenna is sent with the same signal strength in all directions in a generally horizontal plane. The reception of a signal with an omnidirectional antenna is likewise omnidirectional. An omnidirectional antenna does not differentiate in its ability to detect a signal in one direction versus detection of the same or a different signal coming from another direction. The antenna pattern is commonly referred to as a donut shape with the antenna element located at the center of the donut hole. Omni-directional antennas are simple to install because they require no direction adjustment, and are thus often used in these cases.

When using an omnidirectional antenna connected to the wireless communication device, only a fraction of the total transmitted energy will be directed towards the remote base station. The rest will be transmitted away from the base station. This result in a lower antenna gain and inferior antenna performance compared to an antenna where most of the energy is directed towards the receiver, such as e.g. the base station.

A second type of antenna for use by wireless end equipments is a directional antenna. A directional antenna is a High-Gain Antenna (HGA) with a focused, narrow radio wave beam width. This narrow beam width allows more precise targeting of the radio signal. A directional antenna is an antenna which radiates greater power in one or more directions allowing for increased performance on transmit and receive and reduced interference from unwanted sources. Directional antennas provide increased performance over omnidirectional antennas when a greater concentration of energy in a certain direction is desired such as in the case of poor coverage in the cell or on the cell border. Directional antennas also provide increased capacity when being used on the individual links. Since the users of a cell in the wireless communication network shares the power of the radio base station, all users will benefit from the enhanced performance, and thus decreased power consumption, of one single user of the cell.

However, proper installation of a directional antenna is complicated. It often requires a technician using special testing equipment to adjust the direction of the antenna in a precise way to find the direction to the base station giving the best signal since this is normally not known. The special testing equipment may be e.g. software modified phones or spectrum analyzers. This method is technically very good and accurate but high labor cost often makes this option unrealistically expensive.

One way of directing a directional antenna is simply to point it in the direction of the closest base station. The problem with this is that the user often is unaware of the ideal direction to any base station. And even if the user knows the ideal direction to the closest base station, due to transmission reflections this ideal direction pointing straight towards the base station may not always be the best. Further it is difficult or even impossible for the user to know what network operator that is operating the particular base station and thus if it is the network operator of which the end user is a client.

A second way of directing the antenna is to use the signal strength indicators on the wireless communication device to direct the antenna. This is simple and easy but very imprecise since the in-built signal strength indicators of the wireless communication devices are hardware dependant. Thus the in-built signal strength indicators may be inaccurate and/or adjusted differently depending on the manufacturer of the wireless device. Further the in-built signal strength indicators are very rarely given in absolute numbers. Instead the signal strength indicators are often presented as block indicators, however the number of steps of the block indicators differs, examples are 2-10 steps. In some cases the wireless communication devices even completely lack such signal strength indicators.

SUMMARY

It is therefore an object of the present invention to improve the performance of a radio access network by providing an improved and simplified mechanism for assisting in antenna direction adjustment.

According to a first aspect of the present invention, a method in a wireless communication device for assisting in direction adjustment of a directional antenna is provided. The wireless communication device is adapted to be connected to the directional antenna. The wireless communication device is further adapted to be connected to a wireless communication system via the directional antenna. The wireless communication system comprises a node.

The method comprises the first step of establishing a radio connection to the wireless communication system via the directional antenna. The method comprises the second step of sending a request for antenna direction information to the node. The method comprises the third step of receiving the requested antenna direction information from the node. The method comprises the fourth step of obtaining performance measurement according to the received antenna direction information. The method comprises the fifth step of sending the obtained performance measurement to the node. The method comprises the sixth step of receiving an indication of an antenna direction to be used from the node. The antenna direction to be used was determined by the node based on the sent performance measurement.

According to a second aspect of the present invention a method in a service node for assisting in direction adjustment of a directional antenna is provided. The service node is comprised in a wireless communication system. The directional antenna is adapted to be connected to a wireless communication device. The wireless communication device is adapted to be connected to the wireless communication system via the directional antenna.

The method comprises the first step of receiving a request for antenna direction information from the wireless communication device. The method comprises the second step of sending the requested antenna direction information to the wireless communication device. The method comprises the third step of receiving an obtained performance measurement from the wireless communication device. The obtained performance measurement was performed by the wireless communication device according to the sent requested antenna direction information. The method comprises the fourth step of determining an indication of an antenna direction to be used by the wireless communication device based on the received performance measurement. The method comprises the fifth step of sending the antenna direction indication to the wireless communication device.

According to a third aspect of the present invention an arrangement in a wireless communication device for assisting in direction adjustment of a directional antenna is provided. The wireless communication device is adapted to be connected to the directional antenna. The wireless communication device is adapted to be connected to a wireless communication system via the directional antenna. The wireless communication system comprises a node. The wireless communication device arrangement comprises a radio connection unit adapted to establish a radio connection to the wireless communication system via the directional antenna. The wireless communication device arrangement further comprises a sending unit adapted to send a request for antenna direction information to the node. The wireless communication device arrangement further comprises a receiving unit adapted to receive the requested antenna direction information from the node. The wireless communication device arrangement further comprises a measuring unit adapted to obtain performance measurement according to the received antenna direction information. The sending unit is further adapted to send the obtained performance measurement to the node. The receiving unit is further adapted to receive an indication of an antenna direction to be used from the node. The antenna direction to be used was determined by the node based on the sent performance measurement.

According to a fourth aspect of the present invention an arrangement in a service node for assisting in direction adjustment of a directional antenna is provided. The service node is comprised in a wireless communication system. The directional antenna is adapted to be connected to a wireless communication device. The wireless communication device is adapted to be connected to the wireless communication system via the directional antenna. The node arrangement comprises a receiving unit adapted to receive a request for antenna direction information from the wireless communication device. The node arrangement further comprises a sending unit adapted to send the requested antenna direction information to the wireless communication device. The receiving unit is further adapted to receive an obtained performance measurement from the wireless communication device. The obtained performance measurement which was performed by the wireless communication device according to the sent requested antenna direction information. The node arrangement further comprises a determining unit adapted to determine an indication of an antenna direction to be used by the wireless communication device based on the received performance measurement. The sending unit is further adapted to send the antenna direction indication to the wireless communication device.

An advantage with the present invention is that the invention facilitates increased coverage in remote areas that can be hard or expensive to cover. Thus the performance of the wireless communications network and the capacity of the connection are improved and as a result the users of the wireless communication network may benefit by communicating at higher data rates. Further the capacity of the wireless communication network is increased since the interference in the wireless communications network is decreased. This is due to the fact that the directional antenna causes less interference.

Further the quality of service and data throughput is improved also in areas with moderate coverage.

A further advantage of the present invention is that the performance, such as the battery time, of the end wireless communication device is improved when less power is required for transmitting and receiving signals as a result of the optimized direction adjustment of the directional antenna.

Other advantages of the present invention are that the direction adjustment method is easy to perform and low cost. The method is easy to perform because either additional test and/or installation equipment or special network knowledge, such as knowledge of base station location and performance, are required to perform the method steps. Further the method is low cost since the costs of a technician and special test equipment are avoided.

Yet another advantage of the present invention is that the invention is platform independent and can be used for all types of wireless communication devices adapted to be connected to a wireless communication network. Thus, the invention does not require any special handset. This is highly advantageous since the network operators may easily implement this method in all of their wireless communication networks, thus enhancing the network coverage resulting in improved quality of service and data throughput for all users of the operator's wireless networks.

DETAILED DESCRIPTION

The solution is defined as methods and arrangements which may be put into practice in the embodiments below.

Figure 1:
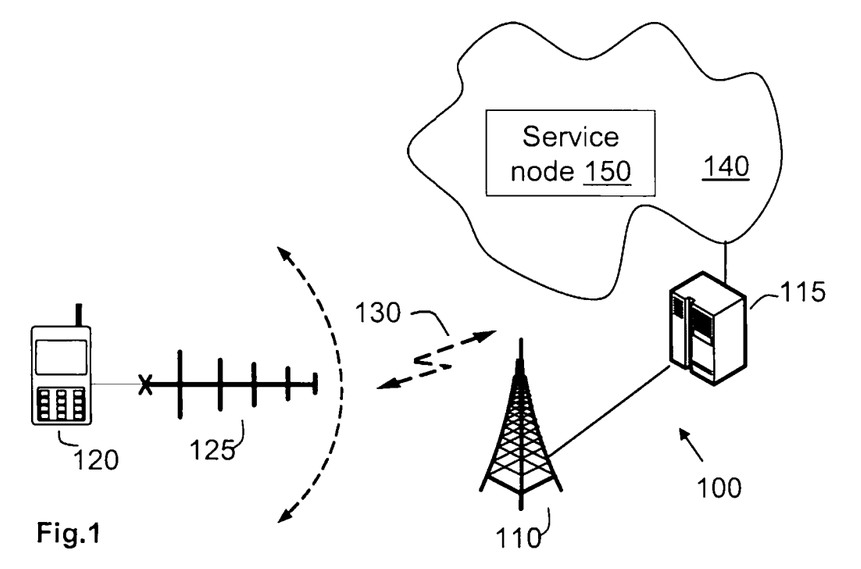
FIG. 1 is a schematic block diagram illustrating some embodiments of a wireless communications network.

FIG. 1 presents an exemplary scenario of a wireless communications system 100 comprising a radio base station 110 and a wireless network node 115 which in this example may be a Radio Network Controller.

The base station 110 is adapted to be connected to a wireless communication device 120 over a radio link 130. The wireless communication device 120 may be e.g. a hand-held telephone, a card in a laptop computer, a personal digital assistant (PDA), a fixed wireless terminal (FWT) and the like. In the example of FIG. 1, the wireless communication device is a hand-held telephone. The wireless communication device 120 is connected to a directional antenna 125 to enhance the network coverage and consequently also the data transmission rate for the network user of the wireless communication device 120. Examples of directional antennas are a Yagi antenna, a Horn antenna, a Patch antenna, a Log-periodic antenna, a Corner reflector and a parabolic antenna.

The wireless communication system 100 further comprises an infrastructure network 140 such as e.g. the Public Switched Telephone Network (PSTN), an IP network or a radio access network. The wireless system 100 uses technologies such as e.g. Wideband Code Division Multiple Access (W-CDMA), High-Speed Packet Access (HSPA), Enhanced UMTS Terrestrial Radio Access (E-UTRA) (Universal Mobile Telecommunications System (UMTS)), 3G Long Term Evolution (3GLTE), Wireless World Initiative New Radio (WINNER), Wireless Local Area Network (W-LAN), Global System for Mobile Communications (GSM), Personal Communications Service (PCS) or D-AMPS, which stands for Digital Advanced Mobile Phone Service (D-AMPS). The infrastructure network 140 comprises a service node 150 performing operation, maintenance and network management functions such as performance measurement and subsequent adjustments of transmission settings to enhance/optimize the transmission performance. An example of a service node 150 is e.g. an Operations Support System (OSS) node.

Figure 2:
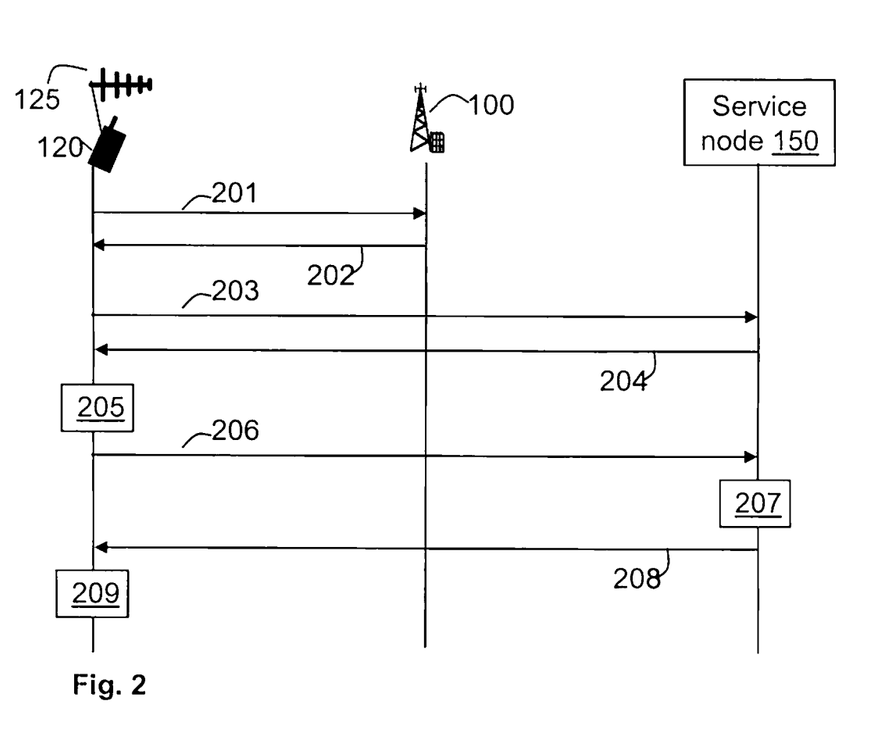
FIG. 2 is a combined flowchart and signaling scheme illustrating some embodiments of a method in a wireless communications network.

The present solution aims at assisting in direction adjustment of the directional antenna 125 connected to the wireless communication device 120 by providing feed back, such as e.g. antenna direction information, from the wireless communication system 100 to the wireless communication device 120. The present solution will now be described with reference to FIG. 2. FIG. 2 shows the antenna direction adjustment method according to some embodiments:

Signaling Steps 201 and 202

Firstly the wireless communication device 120 establishes a connection over the radio link 130 to the wireless communication system 100 by common wireless signaling, as seen in FIG. 2 represented by the signaling steps 201 and 202.

Sending Step 203

The wireless communication device 120 thereafter sends 203 a request for antenna direction information to the service node 150. The sending of antenna direction information request may be represented by dialing a specific telephone number, sending a message, such as e.g. a SMS, a MMS, etc., to a certain receiver or accessing a specific www page. The specific telephone number, message and/or specific www page may access an antenna direction assisting service handled by the service node 150 in the wireless communication network 100.

According to some embodiments the sending of antenna direction information request may be represented by contacting a customer service. The customer service may be capable of accessing the service node 150 to be able to respond either by giving the requested antenna direction information obtained from the service node 150 to the requesting wireless communication device 120 or by triggering the service to execute automatically by the service node 150 as presented below.

Sending Step 204

The service node 150 receives the antenna direction information request 203 and replies by sending 204 the requested antenna direction information in return to the wireless communication device 120. The antenna direction information may be represented by e.g. a text message, such as e.g. a SMS, a MMS or written instructions available on antenna direction assisting service www page, or a voice message. According to some embodiments the antenna direction instructions may be sent 204 repeatedly.

An example of such antenna direction instructions may be "Rotate the antenna slowly. Enter the start angle when starting the sweep and enter the stop angle when stopping the sweep. Press # when finished."

The antenna direction instructions given may also comprise instructions regarding problems likely to arise, and instructions on how to act when the problems have occurred. An example of a problem likely to arise is that the call might drop when the method is performed due to poor network coverage. An exemplary message to be comprised in the antenna direction instruction may be e.g. "If the call is dropped, continue to slowly rotate the antenna until the network is available again. Reconnect to the antenna direction assisting service and continue with a new antenna sweep."

Obtaining Step 205

The received antenna direction information may comprise a request for performance measurement of the radio link 130. The performance measurement may be automatically triggered by the received antenna direction information or wireless communication system 100. An example of such automatic triggering of performance measurement may be e.g. during every 480 ms, during a connection or when setting up or finishing a connection or during handover, which is the case when the wireless communication system 100 is represented by Global System for Mobile communications (GSM).

The received antenna direction information may also comprise instruction intended for the user of the wireless communication device 120. The instructions intended for the user may be used by the user to (be able to) trigger and/or start and/or stop the requested performance measurement.

The antenna direction information may comprise instructions intended for the user of the wireless communication device 120 on how to handle the directional antenna 125 during the performance measurement such as e.g. to move, adjust and/or sweep. This will be exemplified with FIG. 3 further on.

Thus, the wireless communication device 120 obtains 205 the requested performance measurement according to the received antenna direction information. The performance measurement may be obtained 205 repeatedly. The performance measurement may be obtained 205 in a number of ways:

Performance Measurements

The performance measurement may be represented by transmission performance measurement for the radio link 130 regarding at least one antenna direction. Examples of performance measurement that may be applicable according to the present solution are e.g. the Bit Error Rate (BER), Frame Error Rate (FER) and/or the signal strength and/or the field strength and/or other signal quality quantities of the uplink and/or downlink of the radio link 130. Other wireless communication systems, such as e.g. TV networks only consider the downlink when using performance measurements to tune a digital TV box, i.e. adjust the direction of the antenna of the TV. The present solution enables monitoring of signal strength indicators regarding both the downlink and uplink of the radio link 130 and thereafter provides a decision of which direction to point the antenna in order to get the best service.

Detailed examples of performance quantities are given below:

In the example wherein the wireless communication system 100 may be represented by a Global System for Mobile communications (GSM) the following performance quantities, as defined by the Third Generation Partnership Project (3GPP) specification 45.008, may be applicable:

Signal strength downlink may be represented by the performance quantity RXLEVDL.

Signal strength uplink may be represented by the performance quantity RXLEVUL.

Bit Error Rate downlink may be represented by the performance quantity RXQUALDL for the wireless communication device 120 in question.

Bit Error Rate uplink may be represented by the performance quantity RXQUALUL for the wireless communication device 120 in question.

Mean Bit Error Probability may be represented by the performance quantity MBEP xy Bit Error Probability may be represented by the performance quantity CVBEP Frame Error Rate may be represented by the performance quantity FER In the example wherein the wireless communication system 100 may be represented by a UTRAN, short for Universal Mobile Telecommunications System (UMTS) Terrestrial Radio Access Network, the performance measurement, may be represented by any of the following quantities, as defined by 3GPP specification 25.133:

Signal quality may be represented by the performance quantity CPICH Ec/No.

Signal strength downlink may be represented by the performance quantity RSCP.

Block Error Ration may be represented by the performance quantity BLER [%]

According to the embodiments wherein the wireless communication system 100 may be represented by any other wireless communication system such as e.g. a Worldwide Interoperability for Microwave Access (WiMAX) system and/or a 3GPP Long Term Evolution (LTE) system some signal strength and quality measures for the uplink and downlink of the radio link 130 may be suitable/applicable as the performance measures obtained by the wireless communication device 120.

This is very advantageous since no special features in the wireless communication device 120 or no special external measuring equipments are required. Thus the method is performed at low cost.

According to some embodiments the performance measurements may be obtained 205 by the wireless network node 115, such as e.g. a BSC. Examples of the performance measures that may be suitable may be e.g. signal strength, bit error rate and quality measures for the uplink and downlink of the radio link 130. Note that the uplink of the wireless network node 115 is equivalent to the downlink of the wireless communication device 120 and vice versa. Further according to these embodiments the service node 150 may need to collect the performance measurements from the network node 115.

According to some embodiments the obtaining 205 of performance measurements may be performed repeatedly.

Sending Step 206

Further as depicted in FIG. 2 the wireless communication device 120 sends 206 the obtained requested performance measurement to the service node 150. If the wireless communication system 100 is represented by a GSM, the performance measurement results, in the shape of a measurement report, may automatic be sent 206 from the wireless communication device 120 every 480 ms during a call. The measurement report may further be sent to the service node 150 of the wireless communication system 100.

According to some embodiments the sending 206 of obtained performance measurement may be performed repeatedly.

Processing Step 207

The service node 150 receives the performance measurement requested in the antenna direction instruction. The service node 150 processes 207 the received obtained performance measurement. According to some embodiments the processing 207 of the received obtained performance measurement may be performed repeatedly. The processing may be performed by evaluating of the obtained performance measurement regarding several different antenna directions. According to some embodiments the signal strength, bit error rates and quality measures of both the downlink and the uplink of the radio link 130 between the wireless communication device 120 and the wireless communication network 100 may be used when processing the performance measurement. Further according to some embodiments the processing may comprise deciding on which antenna direction that is to be used by the wireless communication device 120 based on the previous evaluation. The antenna direction with the best performance may be decided as the antenna direction to be used According to some embodiments, the service node 150 may be adapted to store and process the received performance measurement. The service node 150 may further evaluate the performance measurement regarding different antenna directions. Further the service node 150 is adapted to decide on one antenna direction to be the antenna direction to be used.

The decision of the antenna direction to be used may be performed as deciding on the antenna direction whose performance measurement results where found to be the highest in the case of signal strength measurements. The decision of the antenna direction to be used may be performed as deciding on the antenna direction whose performance measurement results where found to be the lowest in the case of bit error rate measurements or mean bit error probability measurements.

According to some embodiments the service node 150 may comprise at least one performance data unit such as e.g. a Real time Performance Monitoring (R-PMO) application/unit, a Mobile Traffic Recording (MTR) unit, Performance Management Traffic Recorder Analysis (PMRA) application or the like adapted to store and process performance measurement. The performance data units such as e.g. the R-PMO, the MTR and the PRMA applications are well-known commercially available products handling performance measurement results regarding several wireless communication devices 120 simultaneously.

Further according to these embodiments the service node 150 may be adapted to obtain the performance measurement data from the performance data unit of the service node 150.

The service node 150 may further be adapted to process the obtained measurement, such as e.g. perform comparisons between the obtained measurement regarding several different antenna directions. According to some embodiments the performance measurements of both the downlink and the uplink may be used when processing the performance measurement.

Further according to some embodiments may the processing be represented by deciding on an antenna direction to be used by the wireless communication device 120 based on the previous evaluation. The decision of the antenna direction to be used may be performed as deciding on the antenna direction whose performance measurement results where found to be the best when performing the preceding evaluation.

According to some embodiments the service node 150 may be adapted to collect performance measurement data and or reports from the wireless network node 115. This is due to the fact that according to some embodiments the performance measurement reports may be automatically sent to the wireless network node 115 rather than to the service node 150.

According to some embodiments the processing 207 of the received obtained performance measurement may be performed repeatedly.

Sending Step 208

Thereafter the service node 150 provides feedback to the wireless communication device 130. The service node 150 sends 208 an indication of the antenna direction to be used to the wireless communication device 130.

According to some embodiments the antenna direction indication may be sent 208 repeatedly.

According to some embodiments the antenna direction indication may be represented by e.g. an angle, a compass direction, a clock direction, a tone, a spoken message, a written message, a diagram, a graph, a percentage and/or a chart, a displayed meter, a displayed signal strength meter and/or a field strength meter and/or any other meter showing the quantity which was measured during the performance measurement.

According to some embodiments the antenna direction information may further comprise absolute and/or relative values. Further the antenna direction information may be represented by the unprocessed and/or the processed performance measurement regarding the indicated antenna direction. The unprocessed performance measurement may be e.g. the absolute values of the measured signal strength. According to these embodiments the wireless communication device may serve as a real time field strength meter and/or real time signal strength meter.

The processed performance measurement may be e.g. network coverage information and/or an antenna direction given as a compass direction.

The antenna direction indication may be sent 208 in the shape of e.g. a text message in the shape of a Short Message Service (SMS), a voice message, a phone call, and/or any of the above listed representations being presented on the web page of the antenna direction service. An example of an antenna direction indication represented by a voice message may be e.g. "The antenna direction to be used is 135 degrees southeast. Please adjust your antenna accordingly."

Receiving Step 209

The wireless communication device 120 receives 209 the antenna direction indication from the service node 150. The received 209 feedback information, i.e. indication of antenna direction to be used, may then be used by the network user when installing and/or adjusting the directional antenna 135.

The user of the mobile phone 120 is expected to perform according to the given instructions. I.e. the antenna direction is adjusted accordingly to attain the desired best communication possible.

This is a straight forward easy to grasp method for antenna direction adjustment since no other equipment than the wireless communication device 120 itself is required for the user of the wireless communication device 120. The user simply follows the instructions given and is step by step directed to thereafter find the requested antenna direction to be used.

According to some embodiments when the wireless communication device 120 performs the performance measurement the directional antenna 125 may be adjusted by moving, such as e.g. rotating and/or sweeping, the antenna in a certain pattern and let the service node 150 calculate the direction relative the starting point. It is preferable that the directional antenna 125 is moved with constant speed between two or more directions. A standard compass and/or a special protractor may be used to assist when sweeping the antenna according to some embodiments. These embodiments are truly advantageous since a highly accurate direction for the antenna is produced.

Interaction with the person adjusting the antenna may be needed to trigger the collection of measurement during the antenna sweep. Thus, according to these embodiments, the method step of sending 204 the requested antenna direction information from the service node 150 to the wireless communication device 120 and/or the method step of the wireless communication device 120 obtaining 205 the requested performance measurement and/or the wireless communication device 120 sending 206 the obtained requested performance measurement to the service node 150 and/or the service node 150 processing 207 the received obtained performance measurement are preformed repeatedly which further enhances the method of assisting in adjustment of the directional antenna 125.

FIGS. 3A, 3B, 3C and 3D depict schematic views, from above, of antenna direction adjustments of the directional antenna 125, according to some embodiments, wherein the antenna direction instructions may be sent 204 repeatedly from the service node 150. The directional antenna 125 may be adapted to rotate around an axis 300 of the directional antenna 125. According to the example of FIGS. 3A, 3B, 3C and 3D the antenna direction instructions may be sent 204 four times.

In the example of FIGS. 3A, 3B, 3C and 3D the repeated antenna direction instructions may further enable the obtaining 205 of performance measurement to be performed repeatedly. In the example of FIGS. 3A, 3B, 3C and 3D four antenna direction instructions are sent 204 from the service node 150 to the wireless communication device 120. The obtaining 205 of the requested performance measurement and/or the wireless communication device 120 sending 206 the obtained requested performance measurement to the service node 150 and/or the service node 150 processing 207 the received obtained performance measurement may also be performed repeatedly according to the examples of FIGS. 3A, 3B, 3C and 3D.

Figure 3A:
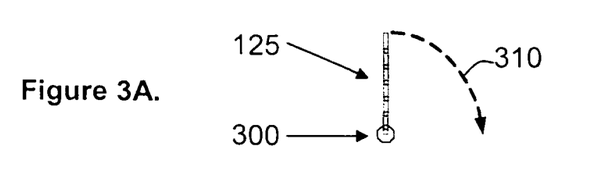
FIGS. 3A, 3B, 3C and 3D are schematic views from above illustrating antenna direction adjustments according to some embodiments.

FIG. 3A depicts the schematic view, from above, of the directional antenna 125. In the example of FIG. 3A, an antenna direction instruction has been received by the wireless communication device 120. The antenna direction instruction may comprise the instruction to rotate the antenna through a first antenna direction sector 310, in this case a ¼ lap clockwise corresponding to an imaginary clock sector between 12 and 3. The antenna direction instruction may also comprise instructions to initiate the performance measurement for the first antenna direction sector 310. An example of such an antenna direction instruction may be e.g. "Rotate the antenna from north to east. Press button 0 when starting and button 3 when stopping." The user of the mobile phone 120 is then expected to perform according to the given instructions. I.e. the first performance measurements for the first antenna direction sector 310 are initiated and the antenna is slowly rotated through the first antenna direction sector 310. Thereafter the first performance measurements may be finished by e.g. pressing the indicated button 3. Further the performance measurement may be sent to the service node 150.

Figure 3B:
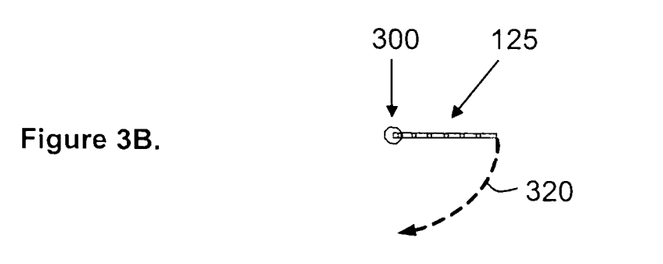

According to the example of FIG. 3B, a second antenna instruction may be sent 204 from the service node 150: The second antenna direction instruction may comprise the instruction to rotate the antenna through a second antenna direction sector 320, in this case a ¼ lap clockwise corresponding to an imaginary clock sector between 3 and 6. The performance measurement may be obtained and sent to the service node 150.

Figure 3C:
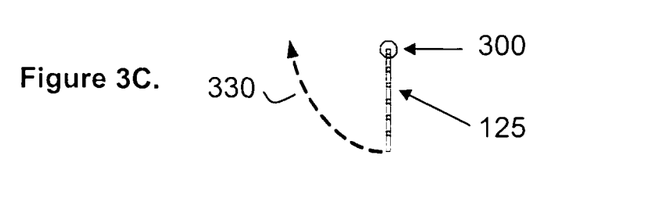

In the example of FIG. 3C, a third antenna instruction may be sent 204 from the service node 150: The third antenna direction instruction may comprise the instruction to rotate the antenna through a third antenna direction sector 330, in this case a ¼ lap clockwise corresponding to an imaginary clock sector between 6 and 9. The performance measurement may be obtained and sent to the service node 150.

Figure 3D:
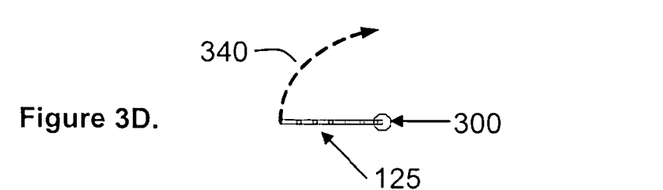

According to the example of FIG. 3D, a fourth antenna instruction is sent 204 from the service node 150: The fourth antenna direction instruction may comprise the instruction to rotate the antenna through a fourth antenna direction sector 340, in this case a ¼ lap clockwise corresponding to an imaginary clock sector between 9 and 13. The performance measurement may be obtained and sent to the service node 150.

Thus the four antenna instructions together enables the performance measuring of all antenna directions in a full lap (of 360 degrees), in this case a clockwise lap.

When the established connection between the wireless communication device 120 and the network 100 provide a communication of high bandwidth embodiments comprising real time measurements and fast feedback are desirable. Thus, a highly attractive solution may be to directly present the performance measurement such as e.g. the signal strength information, to the wireless communication device 120. The direction of the directional antenna 125 may then be adjusted and fine tuned using the repeatedly received processed performance measurements in the shape of the performance indication repeatedly sent 208 from the service node 150.

This is a cost effective method which is easy to use since no special equipment or knowledge of base station location is needed! The user simply, and preferably slowly, rotates the directional antenna 125 while monitoring the antenna direction indication in the shape of e.g. a tone indicating the measured signal strength. Thereafter the directional antenna 125 may be returned to the antenna direction with the highest field strength. The antenna direction may further be fine tuned using small angle movements.

According to these embodiments, the method step of sending 204 the requested antenna direction information from the service node 150 to the wireless communication device 120 and/or the method step of the wireless communication device 120 obtaining 205 the requested performance measurement and/or the wireless communication device 120 sending 206 the obtained requested performance measurement to the service node 150 and/or the service node 150 processing 207 the received obtained performance measurement and/or the service node 150 sending 208 the indication of the antenna direction to be used may all be performed repeatedly.

According to some embodiments the method is entirely performed by the wireless communication device 120. These embodiments require that the wireless communication device may be adapted to perform the method steps/tasks previously described as performed by the service node 150. A possible way of enabling the wireless communication device 120 to perform the entire method may be to provide the wireless communication device 120 with the capability of performing these tasks.

According to some embodiments the wireless communication device 120 may be provided with an added feature, such as e.g. a downloadable application.

The added feature, such as e.g. the downloadable application may be adapted to provide the requested antenna direction information and may further be adapted to process the received obtained performance measurement and may thereafter be adapted to provide an indication of the antenna direction to be used.

Figure 4:
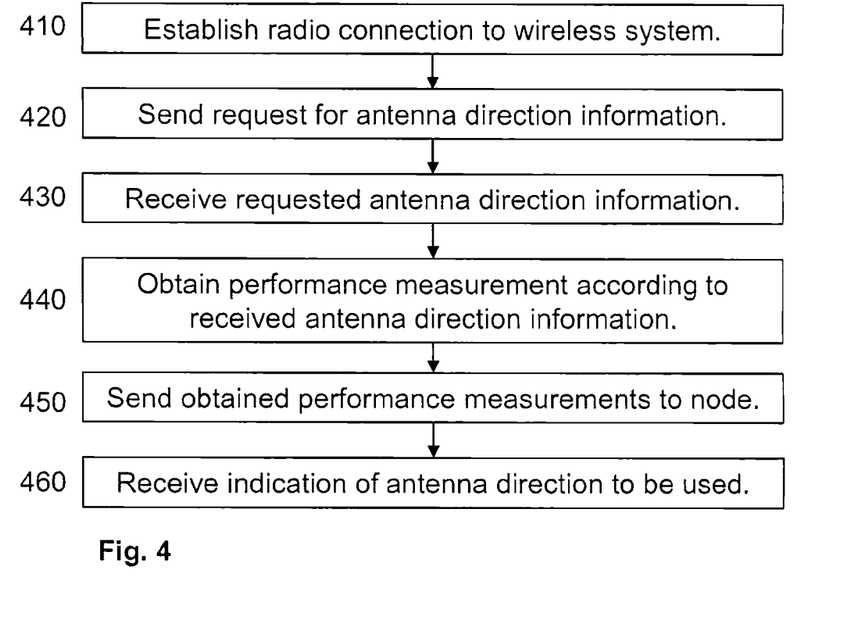
FIG. 4 is a flow chart illustration method steps performed in a wireless communication device according to some embodiments.

The present method for assisting in direction adjustment of a directional antenna 125, performed by the wireless communication device 120, will now be described with reference to a flow chart depicted in FIG. 4:

410 The wireless communication device 120 establishes a radio connection to the wireless communication system 100 via the directional antenna 125.

420 Further the wireless communication device 120 sends a request for antenna direction information to the service node 150.

According to some embodiments this step may be performed by sending a request for antenna information to an antenna direction unit 550 comprised within the wireless communication device 120.

430 The wireless communication device 120 receives the requested antenna direction information from the service node 150.

According to some embodiments this step may be performed repeatedly/several times.

According to some embodiments this step may be performed by receiving the requested antenna direction information from an antenna direction unit 550 comprised within the wireless communication device 120.

440 The performance measurement is obtained by the wireless communication device 120 according to the received antenna direction information.

According to some embodiments this step may be performed repeatedly/several times.

According to some embodiments this step may be performed by measuring at least one of the performance quantities signal strength, bit error rate, mean bit error probability, frame error rate, signal quality and/or block error ration.

According to some embodiments this step may further be performed by measuring the performance quantity for the uplink and/or the downlink of the radio connection 130 to the wireless communication device 120.

According to some embodiments this step may be triggered by the received antenna adjustment information.

According to some embodiments this step may be triggered by user input based on the received antenna adjustment information.

450 The wireless communication device 120 sends the obtained performance measurement to the service node 150.

According to some embodiments this step may be performed repeatedly.

According to some embodiments the sending of the obtained performance measurement to the service node 150 may be performed by sending the obtained performance measurement to an antenna evaluation unit 560 comprised within the wireless communication device 120.

460 Thereafter the wireless communication device 120 receives an indication of an antenna direction to be used from the service node 150, which antenna direction was determined by the service node 150 based on the sent performance measurement.

According to some embodiments this step may be performed repeatedly.

According to some embodiments this step may be performed by receiving an indication of an antenna direction to be used from the antenna evaluation unit 560, which antenna direction was determined by the antenna evaluation unit 560 based on the sent performance measurement.

According to some embodiments the indication of antenna direction may be represented by direction information in the shape of an angle, a compass direction and/or a clock direction.

According to some embodiments the indication of antenna direction may further be presented in the shape of a tone, a spoken message, a written message, a displayed meter, a diagram, a graph and/or a chart.

Figure 5:
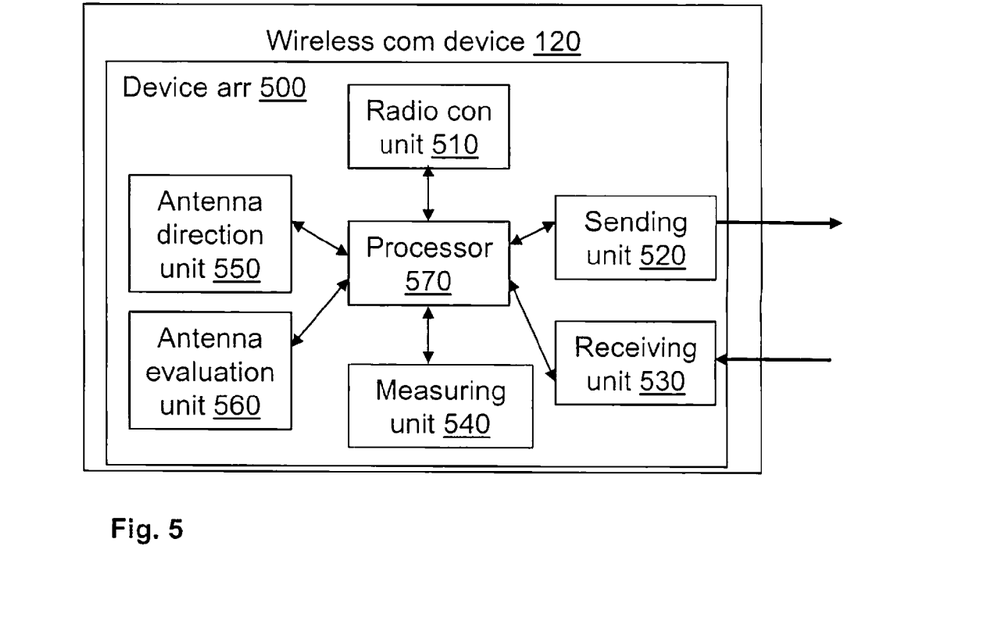
FIG. 5 is a block diagram of a wireless communication device according to some embodiments.

To perform the method steps above, the wireless communication device 120 comprises an arrangement 500 as depicted in FIG. 5.

The wireless communication device arrangement 500 comprises a radio connection unit 510 adapted to establish a radio connection to the wireless communication system 100 via the directional antenna 125.

The wireless communication device arrangement 500 further comprises a sending unit 520 adapted to send a request for antenna direction information to the service node 150.

The sending unit 520 further is adapted to send the obtained performance measurement to the service node 150.

According to some embodiments the sending unit 520 may further be adapted to send the request for antenna direction information to an antenna direction unit 550.

The wireless communication device arrangement 500 also comprises a receiving unit 530 adapted to receive the requested antenna direction information from the service node 150.

The receiving unit 530 further is adapted to receive from the service node 150, an indication of an antenna direction to be used which antenna direction was determined by the service node 150 based on the sent performance measurement.

According to some embodiments the receiving unit 530 may further be adapted to receive the requested antenna direction information from an antenna direction unit 550.

According to some embodiments the sending unit 520 may further be adapted to send the obtained performance measurement to an antenna evaluation unit 560.

According to some embodiments the receiving unit 530 may further be adapted to receive from the antenna evaluation unit 560, the antenna direction indication.

The wireless communication device arrangement 500 comprises a measuring unit 540 adapted to obtain performance measurement according to the received antenna direction information.

According to some embodiments the wireless communication arrangement 500 may further comprise an antenna direction unit 550 adapted to receive a request for antenna direction information from the wireless communication device 120.

According to some embodiments the antenna direction unit 550 may further be adapted to send the requested antenna direction information to the receiving unit 530.

According to some embodiments the antenna direction unit 550 may be an application to be downloaded.

According to some embodiments the wireless communication arrangement 500 may further comprise an antenna evaluation unit 560 adapted to receive the obtained performance measurement.

According to some embodiments the antenna evaluation unit 560 may further be adapted to determine an indication of an antenna direction to be used by the wireless communication device 120, based on the received performance measurement.

According to some embodiments the antenna evaluation unit 560 may further be adapted to send the antenna direction indication to the wireless communication device 120/receiving unit 530.

According to some embodiments the antenna evaluating unit 560 may further be adapted to evaluate the received performance measurement regarding at least one antenna direction.

According to some embodiments the antenna evaluating unit 560 may further be adapted to decide the antenna direction to be used based on the evaluated performance measurement regarding the at least one antenna direction.

According to some embodiments the antenna evaluation unit 560 may be represented by a downloadable application.

The present method for assisting in direction adjustment of a directional antenna 125, performed by the service node 150 will now be described with reference to a flow chart depicted in FIG. 6.

610. The service node 150 receives a request for antenna direction information from the wireless communication device 120.

620. The service node 150 sends the requested antenna direction information to the wireless communication device 120.

According to some embodiments this step may be performed repeatedly.

630. Thereafter the service node 150 receives an obtained performance measurement from the wireless communication device 120, which measurement was performed by the wireless communication device 120 according to the sent requested antenna direction information.

640. Then the service node 150 determines an indication of an antenna direction to be used by the wireless communication device 120, the determining being performed based on the received performance measurement.

According to some embodiments this step may be performed repeatedly.

641. According to some embodiments the method step of determining an indication of an antenna direction may further comprise the method sub step of evaluating the received performance measurement regarding at least one antenna direction.

642. According to some embodiments the method step of determining an indication of an antenna direction may further comprise the method sub step of deciding the antenna direction to be used based on the evaluated performance measurement regarding the at least one antenna direction.

650. The service node 152 sends the antenna direction indication to the wireless communication device 120.

According to some embodiments this step may be performed repeatedly.

Figure 7:
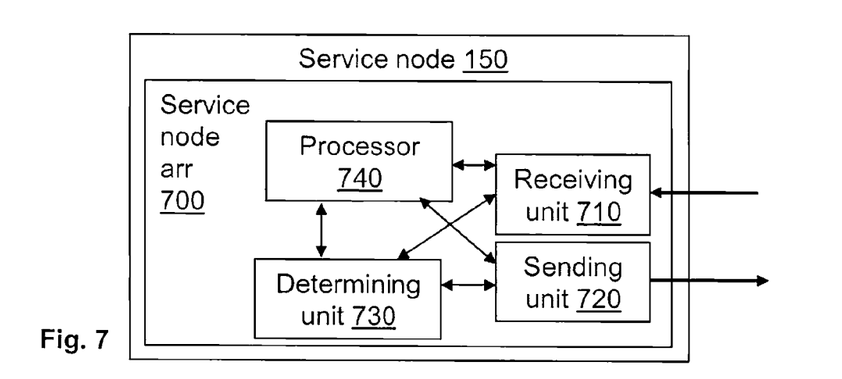
FIG. 7 is a block diagram of a node according to some embodiments.

To perform the method steps above, the service node 150 comprises an arrangement 700 as depicted in FIG. 7. The node arrangement 700 is adapted to assist in direction adjustment of the directional antenna 125 according to the present solution. The node arrangement 700 may be internal or external to the service node 150.

The node arrangement 700 comprises a receiving unit 710 adapted to receive a request for antenna direction information from the wireless communication device 120. The receiving unit 710 may further be adapted to receive, from the wireless communication device 120, an obtained performance measurement. The obtained performance measurement was performed by the wireless communication device 120 according to the sent requested antenna direction information.

The node arrangement 700 comprises a sending unit 720 adapted to send the requested antenna direction information to the wireless communication device 120. The sending unit being further adapted to send the antenna direction indication to the wireless communication device 120.

The node arrangement 700 further comprises a determining unit 730 adapted to determine an indication of an antenna direction to be used by the wireless communication device 120, based on the received performance measurement.

According to some embodiments the determining unit 730 may further be adapted to evaluate the received performance measurement regarding at least one antenna direction.

According to some embodiments the determining unit 730 may further be adapted to decide the antenna direction to be used based on the evaluated performance measurement regarding the at least one antenna direction.

Figure 6:
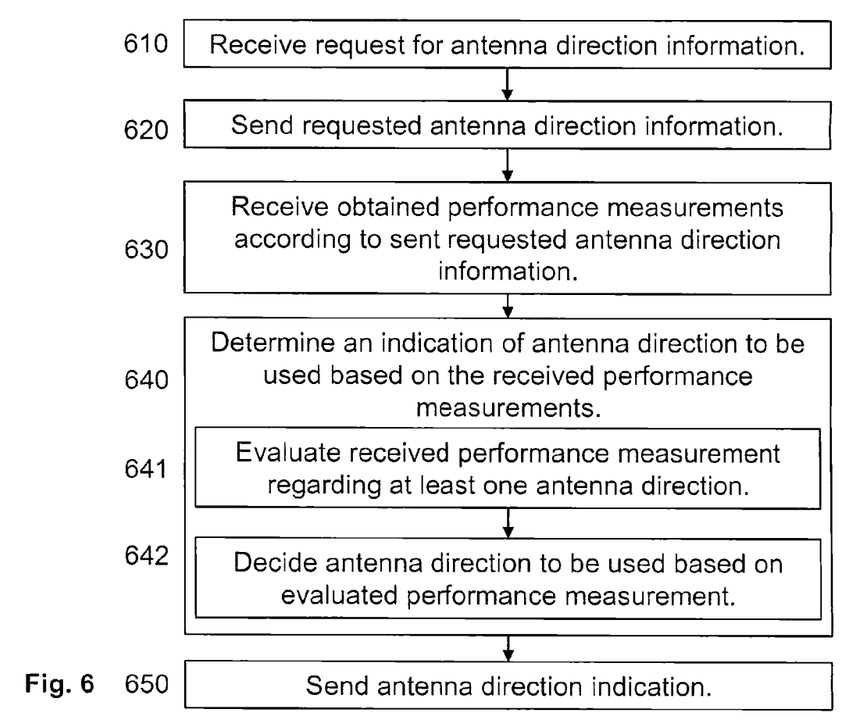
FIG. 6 is a flow chart illustration method steps performed in a node according to some embodiments.

The present methods for assisting in direction adjustment of a directional antenna can be implemented through one or more processors, such as e.g. the processor 570 in the wireless communication device 120 depicted in FIG. 6 or the processor 740 in the service node 150 depicted in FIG. 7, together with computer program code for performing the functions of the invention. The program code mentioned above may also be provided as a computer program product, for instance in the form of a data carrier carrying computer program code for performing the present method when being loaded into any of the wireless communication device 120, the service node 150 and/or the node arrangement 700. One such carrier may be in the form of a CD ROM disc. It is however feasible with other data carriers such as e.g. a memory stick. The computer program code can furthermore be provided as pure program code on a server and downloaded to any of the nodes as listed above remotely.

When using the word "comprise" or "comprising" it shall be interpreted as non-limiting, in the meaning of "consist at least of".

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a wireless communication device for assisting in direction adjustment of a directional antenna, which wireless communication device is adapted to be connected to the directional antenna, which wireless communication device is adapted to be connected to a wireless communication system via the directional antenna, the wireless communication system comprising a service node, the method comprising the steps of:

establishing a radio connection to the wireless communication system via the directional antenna;
sending a request for antenna direction information to the service node;
receiving the requested antenna direction information from the service node;
obtaining performance measurement according to the received antenna direction information;
sending the obtained performance measurement to the service node; and
receiving from the service node, an indication of an antenna direction to be used which antenna direction was determined by the service node based on the sent performance measurement,
wherein the indication of antenna direction is represented by direction information in the shape of an angle, a compass direction and/or a clock direction.

2. The method according to claim 1, wherein the method steps of receiving the requested antenna direction information from the service node and/or the method step of obtaining performance measurement according to the received antenna direction information and/or the method step of sending the obtained performance measurement to the service node and/or the method step of receiving from the service node an indication of an antenna direction to be used are performed repeatedly/several times.

3. The method according to claim 1, wherein the indication of antenna direction is presented in the shape of a tone, a spoken message, a written message, an displayed meter, a diagram, a graph and/or a chart.

4. The method according to claim 1, wherein the step of obtaining the performance measurement is performed by measuring at least one of the performance quantities signal strength, bit error rate, mean bit error probability, frame error rate, signal quality and/or block error ration.

5. The method according to claim 1, wherein the step of obtaining the performance measurement is performed by measuring the performance quantity for the uplink and/or the downlink of the radio connection to the wireless communication device.

6. The method according to claim 1, wherein the step of obtaining performance measurement is triggered by the received antenna adjustment information.

7. The method according to claim 1, wherein the step of obtaining performance measurement is triggered by user input based on the received antenna adjustment information.

8. The method according to claim 1, wherein the step of sending a request for antenna direction information to the service node, is instead sent to an antenna direction unit comprised within the wireless communication device.

9. The method according to claim 1, wherein the step of receiving the requested antenna direction information from the service node is instead received from an antenna direction unit comprised within the wireless communication device.

10. The method according to claim 1, wherein the step of sending the obtained performance measurement to the service node is instead sent to an antenna evaluation unit comprised within the wireless communication device.

11. The method according to claim 1, wherein the step of receiving from the service node, an indication of an antenna direction to be used which antenna direction was determined by the service node based on the sent performance measurement is instead received from the antenna evaluation unit comprised within the wireless communication device, which antenna direction was determined by the antenna evaluation unit based on the sent performance measurement.

12. The method according to claim 1, wherein the received indication of an antenna direction includes an instruction for rotating the directional antenna by a predetermined amount, the method further comprising:
rotating the directional antenna by the predetermined amount specified in the received indication of an antenna direction.

13. The method according to claim 12, wherein the received indication of an antenna direction is included in a text message.

14. The method according to claim 1, wherein the request for antenna direction information is a message specifying that service node provide an instruction for changing a direction of the directional antenna.

15. The method according to claim 14, wherein the message is a text message.

16. A method in a service node for assisting in direction adjustment of a directional antenna, which service node is comprised in a wireless communication system, the directional antenna is adapted to be connected to a wireless communication device, which wireless communication device is adapted to be connected to the wireless communication system via the directional antenna, the method comprising the steps of:
receiving a request for antenna direction information from the wireless communication device;
sending the requested antenna direction information to the wireless communication device;
receiving from the wireless communication device, an obtained performance measurement, which measurement were performed by the wireless communication device according to the sent requested antenna direction information;
determining an indication of an antenna direction to be used by the wireless communication device, based on the received performance measurement; and
sending the antenna direction indication to the wireless communication device,
wherein the indication of antenna direction is represented by direction information in the shape of an angle, a compass direction and/or a clock direction.

17. The method according to claim 16, wherein the method step of sending the requested antenna direction information to the wireless communication device and/or the method step of receiving obtained performance measurement and/or the method step of determining an indication of an antenna direction to be used and/or the method step of sending the antenna direction indication are performed repeatedly/several times.

18. The method according to claim 16, wherein the step of determining an indication of an antenna direction further comprises the method sub steps:
evaluating the received performance measurement regarding at least one antenna direction,
deciding the antenna direction to be used based on the evaluated performance measurement regarding the at least one antenna direction.

19. An arrangement in a wireless communication device for assisting in direction adjustment of a directional antenna, which wireless communication device is adapted to be connected to the directional antenna, which wireless communication device is adapted to be connected to a wireless communication system via the directional antenna, the wireless communication system comprising a service node, the wireless communication device arrangement comprising:
a radio connection unit adapted to establish a radio connection to the wireless communication system via the directional antenna;

a sending unit adapted to send a request for antenna direction information to the service node;

a receiving unit adapted to receive the requested antenna direction information from the service node; and a measuring unit adapted to obtain performance measurement according to the received antenna direction information, the sending unit further being adapted to send the obtained performance measurement to the service node, and the receiving unit further being adapted to receive from the service node, an indication of an antenna direction to be used which antenna direction was determined by the service node based on the sent performance measurement, wherein the indication of antenna direction is represented by direction information in the shape of an angle, a compass direction and/or a clock direction.

20. The wireless communication device arrangement according to claim 19, wherein the sending unit further being adapted to send the request for antenna direction information to an antenna direction unit, the wireless communication arrangement further comprising an antenna direction unit adapted to receive a request for antenna direction information, the antenna direction unit further being adapted to send the requested antenna direction information to the receiving unit, the receiving unit further being adapted to receive the requested antenna direction information from the antenna direction unit, the sending unit further being adapted to send the obtained performance measurement to an antenna evaluation unit, the wireless communication arrangement further comprising an antenna evaluation unit adapted to receive the obtained performance measurement, the antenna evaluation unit further being adapted to determine an indication of an antenna direction to be used by the wireless communication device, based on the received performance measurement, the antenna evaluation unit further being adapted to send the antenna direction indication to the receiving unit, and the receiving unit further being adapted to receive from the antenna evaluation unit, the antenna direction indication.

21. The wireless communication device arrangement according to claim 20, wherein the antenna evaluating unit further being adapted to evaluate the received performance measurement regarding at least one antenna direction, and the antenna evaluating unit further being adapted to decide the antenna direction to be used based on the evaluated performance measurement regarding the at least one antenna direction.

22. The wireless communication device arrangement according to claim 20, wherein each of the antenna direction unit and antenna evaluation unit is an application to be downloaded.

23. An arrangement in a service node for assisting in direction adjustment of a directional antenna, which service node is comprised in a wireless communication system, the directional antenna is adapted to be connected to a wireless communication device, which wireless communication device is adapted to be connected to the wireless communication system via the directional antenna, the node arrangement comprising:

a receiving unit adapted to receive a request for antenna direction information from the wireless communication device;

a sending unit adapted to send the requested antenna direction information to the wireless communication device; and a determining unit adapted to determine an indication of an antenna direction to be used by the wireless communication device, based on the received performance measurement, wherein the receiving unit further being adapted to receive from the wireless communication device an obtained performance measurement, which measurement was performed by the wireless communication device according to the sent requested antenna direction information, and the sending unit further being adapted to send the antenna direction indication to the wireless communication device, wherein the indication of antenna direction is represented by direction information in the shape of an angle, a compass direction and/or a clock direction.

24. The service node arrangement according to claim 23, wherein the determining unit further is/being adapted to evaluate the received performance measurement regarding at least one antenna direction, and wherein the determining unit further is/being adapted to decide the antenna direction to be used based on the evaluated performance measurement regarding the at least one antenna direction.

* * * * *